Aug. 28, 1928.
T. MARSHALL, JR
1,681,944
TRUCK FOR STORAGE BATTERIES
Filed Aug. 5, 1926     2 Sheets-Sheet 1
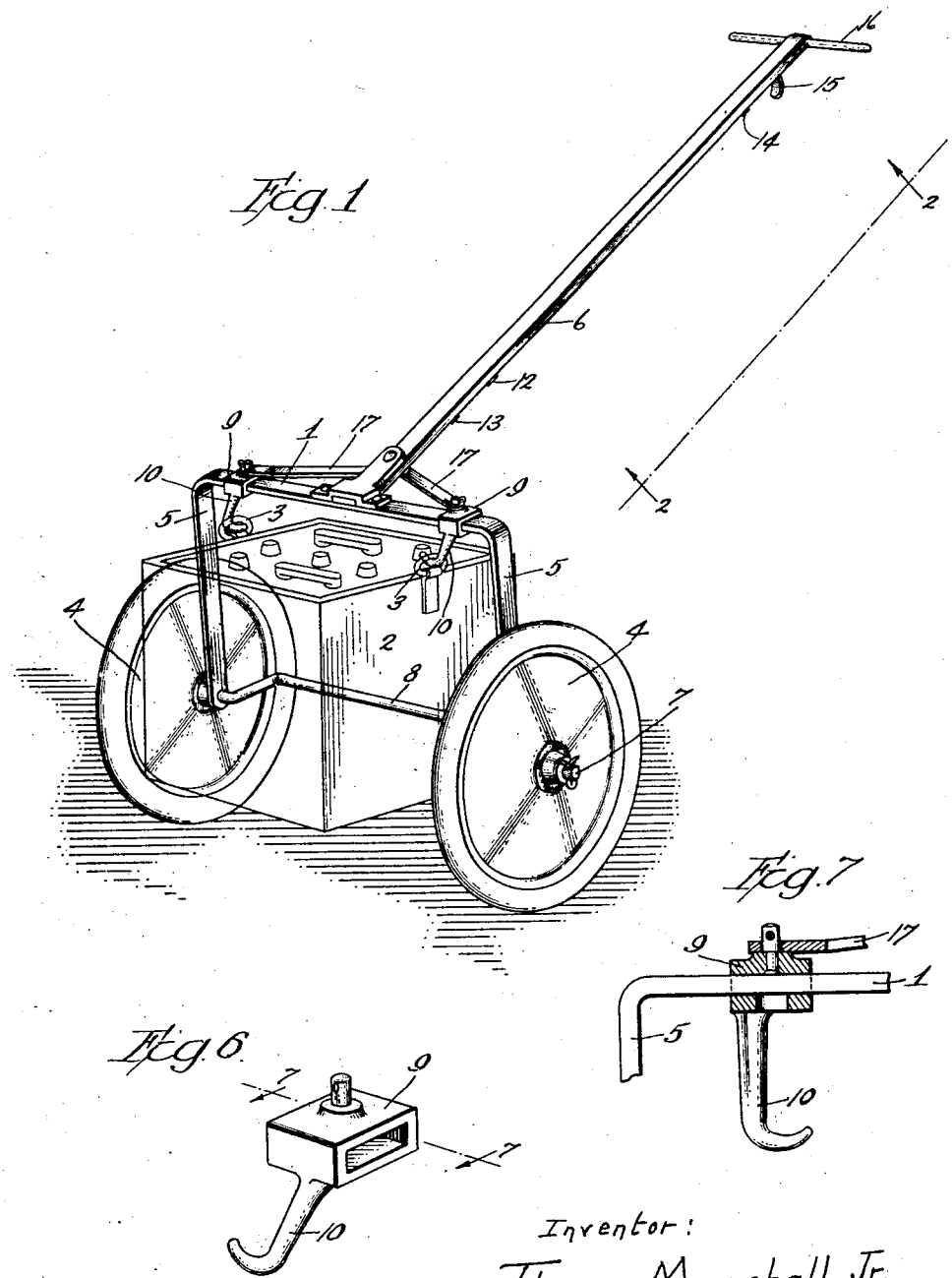
Inventor:
Thomas Marshall Jr.
by Albert Scheith
Attorney

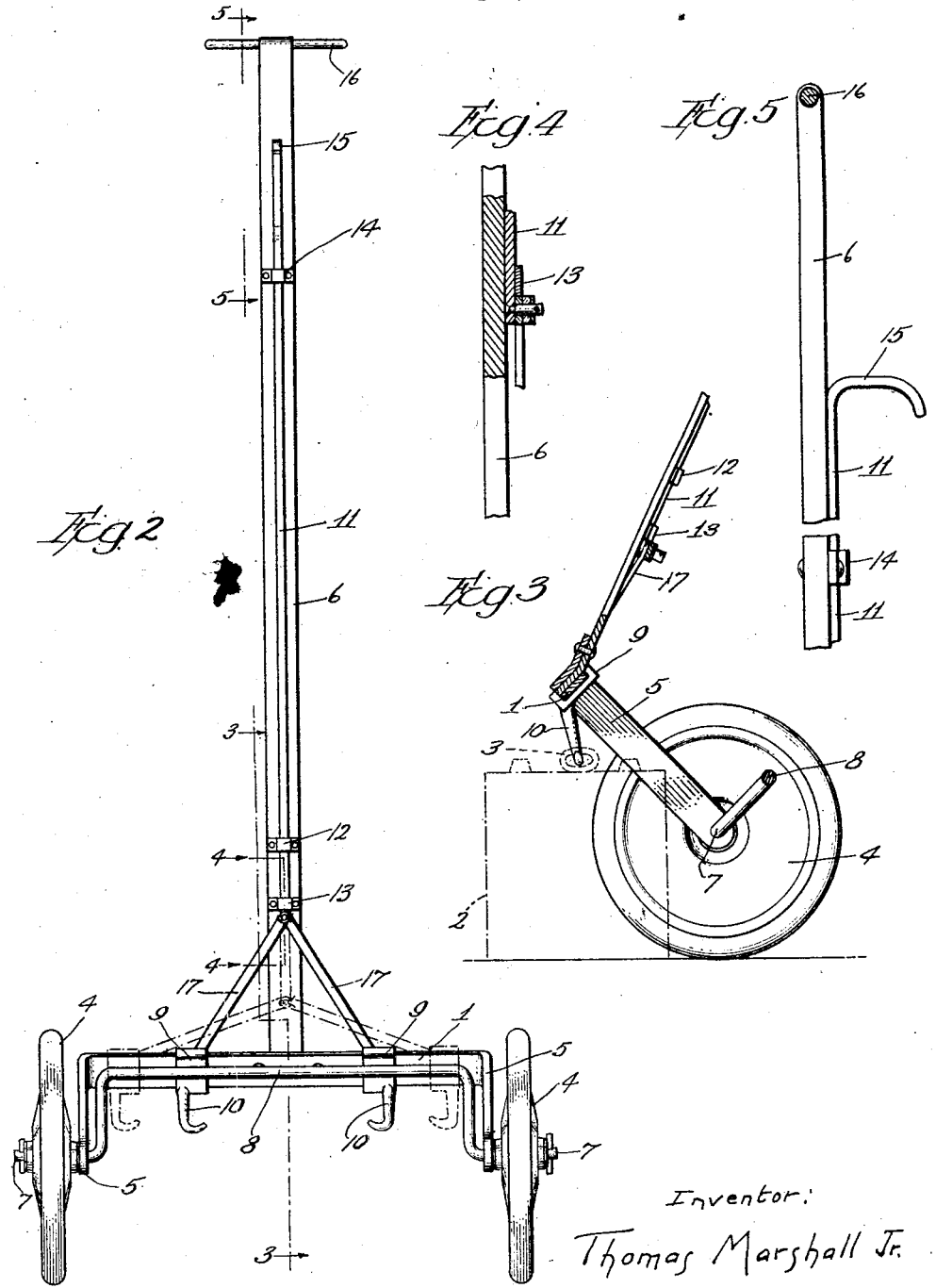

Patented Aug. 28, 1928.

1,681,944

UNITED STATES PATENT OFFICE.

THOMAS MARSHALL, JR., OF CHICAGO, ILLINOIS.

TRUCK FOR STORAGE BATTERIES.

Application filed August 5, 1926. Serial No. 127,290.

My invention relates to a truck for conveying objects (such as storage batteries) which normally rest on a floor and which are provided with spaced and alined ears, hooks or handles adapted to be gripped for lifting the object.

Commercial storage batteries usually have alined and upwardly projecting ears, so that they may be lifted and carried by grasping these ears. Owing to their weight, such batteries cannot be slid along the floor, and the manual transporting of each battery in a charging station, automobile service station or garage is both a slow and laborious task. Furthermore, such batteries cannot readily be handled on trucks of the type employed for carting barrels or boxes, as the use of ordinary two-wheeled trucks would undesirably tilt the batteries, thereby spilling the solution, besides severely jarring the batteries when the truck jaws are slipped from under them. On the other hand, platform trucks also are not advantageous, as they require a laborious lifting of the batteries both for setting them on the trucks and for replacing them on the ground.

My present invention aims to provide a truck equipped for grasping the ears (or other grippably formed portions) of a storage battery or the like, arranged so that the user can exert a considerable leverage in lifting the battery off the ground, and so that the battery will readily be balanced with respect to the wheel axis when the truck is in use. It also provides a wheeled truck for this purpose which will enable the user to grasp or release the battery by manipulating a handle disposed within convenient reach of the handle on the truck, which will permit the battery to remain substantially upright at all times, and which will allow the user to set the battery down on the floor without imparting any jar to it.

Furthermore, my invention provides a truck construction for such purposes which will be compact and easily maneuvered in cramped quarters, which can readily be manipulated by inexperienced persons, and which will be both simple and durable.

Still further and also more detailed objects will appear from the following specification and from the accompanying drawings, in which drawings—

Fig. 1 is a perspective view of a truck embodying my invention, showing this as it appears when a battery is being wheeled with it.

Fig. 2 is a view looking diagonally upward at the truck in the direction of the arrows 2—2 of Fig. 1, but drawn on a larger scale.

Fig. 3 is a vertical section, taken along the line 3—3 of Fig. 2.

Fig. 4 is a fragmentary vertical section, taken along the line 4—4 of Fig. 2.

Fig. 5 is an enlarged and fragmentary side elevation, taken from the line 5—5 of Fig. 2.

Fig. 6 is an enlarged perspective view of one of the sliding hook members.

Fig. 7 is a vertical section taken through the same hook member along the line 7—7 of Fig. 6 and showing a portion of the frame member on which this hook slides.

In constructing the truck of my invention for the handling of a standard type of storage batteries, I employ a frame member formed of stiff flat steel bent into an inverted U-shape, with the back or top 1 of the inverted U considerably wider than the length of the battery 2 in the direction in which the ears 3 on the battery are spaced from each other. Wheels 4 are journaled on the lower or free end of each shank 5 of the U-shaped frame member, and a relatively long tongue 6 is secured at its forward end to the middle of the top 1 of this frame member. To co-operate with the stiffness of the frame member in preventing the shank 5 of the latter from spreading, I may connect the wheel axles 7 by a rigid brace portion 8 which is bent so that it will freely clear the battery at the rear of the latter.

Supported by the back or top 1 of the U-shaped frame member are a pair of hook members, each of which includes a tubular body portion 9 through which the said frame top 1 extends and a depending hook 10 having its opening directed towards the axis of the tongue 6. Each of the hook member bodies 9 is bored out so that it can slide freely on the frame member of the truck, and the two hook members are connected to operating means whereby they can be slid towards or away from each other.

For the operating means, I provide a control member 11 supported adjacent to the bottom of the tongue 6 by straps 12, 13 and 14 secured to this tongue and slidable longitudinal of the said tongue. The control member terminates at its upper or rear end in a handle 15 which preferably is disposed near a cross-bar 16 at the upper or rear end of the tongue 6, so as to be within easy reach of the user who wheels the truck by manipulating this cross-bar. The other or forward end of the control member 11 is operatively connected to both of the hook members, by links 17 each of which is pivoted at its rear end to the control member and pivoted at its forward end to one of the hook members, so that these links effectively form a toggle joint connection between the slidable control member and the two hook members. To restrict the angle between the two links to one in which the sliding of the hook members can easily be effected by the control member, I am showing the rear strap 14 as positioned for engaging the handle 15 so as to limit the forward movement of the control member and consequently the spreading movement of the hook members. I am also showing another strap member (12) as positioned for engaging the rear ends of the links 17, so as to limit the rearward movement of the slidable control member, thereby also limiting the relative approaching of the two hook members.

When a thus constructed truck is employed for moving a battery, the user first moves the control member forwardly so as to spread the hooks farther apart than the ears 3 on the battery, as for example to the positions shown in dotted lines in Fig. 1. He then tilts the tongue of the truck upwardly so as to dispose the tips of the hooks 10 at a height corresponding to the apertures of the battery ears 3 and wheels the truck so that its frame spans the battery and so that the hooks aline with the battery ears, after which he pulls the handle 15 of the control member rearwardly so as to draw the hook tips through the battery ears. On then pressing the cross-bar 16 downwardly, the back or top 1 of the truck frame member is raised, thereby causing the hooks to lift the battery off the ground. By disposing the truck frame member so that this normally is tilted forwardly, I cause the hooks to be forward of the wheel axis, thereby tending to balance the weight of the long tongue 6. Hence the user can easily hold the tongue in a position in which the center of gravity of the battery is substantially in the same vertical plane with the wheel axis, so that the only power required is that for propelling the trucks.

By using wheels 4 of a suitable diameter, I am readily able to have the frame top 1 clear the top of the battery and to dispose the hook ends 10 so that these can enter the ears or handles of a battery on the floor, when the tongue is tilted upwards. When the user reaches the desired new location for the battery, he merely tilts the tongue of the truck upward so as to set the battery down, and then pulls the control handle 15 rearwardly to spread the hooks apart, thereby leaving the truck free and ready for use with the next battery. During the transporting of the battery by the truck, the weight of the battery presses the hook members so firmly against the frame back or top 1 that the resulting friction prevents any spreading movement of the said hook members, hence no auxiliary means are needed to guard against an accidental detaching of the battery from the truck.

Since the power required for propelling the truck is trivial and since the length of the tongue affords a large leverage for raising the battery off the ground, the entire effort required for moving a battery is exceedingly small. Indeed, I have found that my truck can easily be employed even for wheeling standard sizes of batteries up and down stairs. Moreover, the same leverage also makes it easy for the user to set the battery down without jarring it, and, since the ears are usually disposed along a medial vertical plane of the battery, the latter need not be tilted at any time. So also, the compactness of my truck enables this to be used in cramped quarters.

However, while I have illustrated and described my truck in an embodiment including structural details which I have found to be quite practical, I do not wish to be limited to the details of construction and arrangement thus disclosed. Obviously, many changes might be made without departing either from the spirit of my invention or from the appended claims. Nor do I wish to be limited to the use of such trucks for handling storage batteries, as they could obviously be employed with equal advantages for moving any other objects which have handles, ears or other grippable portions disposed so that they can be grasped by a pair of relatively approachable hook members.

I claim as my invention:

1. A two-wheeled truck for handling an object having a pair of laterally spaced portions formed to be gripped, comprising a rigid frame of inverted U-shaped vertical section consisting of a horizontal top bar and a pair of depending arms spaced by a distance greater than the object, two wheels respectively journaled to the two arms on a common axis disposed for supporting the frame with the said top bar higher than the spaced portions of the object; a tongue secured to the middle of the top bar and extending rearward transversely of the top bar; a pair of hook members slidably mounted on the top bar at opposite sides of the tongue and depending from the tongue, the top bar and the hook members being formed for preventing rotation of the hook members about the top bar; a control member mounted on the tongue for slidable movement longitudinally of the latter, a pair of links directly connecting the forward end of the control member with the hook members, and a handle on the control member adjacent to the free end of the tongue for manipulating the control member.

2. An object handling truck as per claim 1, in which the hook members depend forwardly from the top bar at an acute angle to a medial plane taken transversely of the truck through the frame and through the axis of the wheels.

3. A truck as per claim 1, in which the tongue extends obliquely rearwardly and the hook members depend at an acute angle forwardly from a medial plane taken transversely of the truck through the frame and through the axis of the wheels.

4. A two-wheeled truck for handling an object having a pair of laterally spaced portions formed to be gripped, comprising a rigid frame of inverted U-shaped vertical section consisting of a horizontal top bar and a pair of depending arms spaced by a distance greater than the object, two wheels respectively journaled to the two arms on a common axis disposed for supporting the frame with the said top bar higher than the spaced portions of the object; a tongue secured to the middle of the top bar and extending rearward transversely of the top bar; a pair of hook members slidably mounted on the top bar at opposite sides of the tongue and depending from the tongue, the top bar and the hook members being formed for preventing rotation of the hook members about the top bar; a plurality of guides mounted on the tongue and spaced longitudinally of the tongue, a control member extending slidably through the guides, and connections between the control member and the hook members for causing a sliding of the control member to move both hook members simultaneously toward or away from the tongue.

5. An object handling truck as per claim 1, including a shaft extending through and fast upon both arms of the frame for journaling the wheels; the portion of the shaft between the wheels being bent to a horizontal U-shape to form a pair of arms spaced by a distance greater than the width of the object and a cross-bar disposed behind the object when the truck is in position for having its hook members engage the said laterally spaced portions of the object.

6. An object handling truck as per claim 1, including a rigid brace connecting the arms of the frame and formed to extend behind the object when the truck is disposed for moving the object.

Signed at Chicago, Illinois, July 27th, 1926.

THOMAS MARSHALL, Jr.